US009965010B2

(12) United States Patent
Lambert et al.

(10) Patent No.: US 9,965,010 B2
(45) Date of Patent: May 8, 2018

(54) SYSTEMS AND METHODS FOR MANAGEMENT OF AN INFORMATION HANDLING SYSTEM HAVING NO ALTERNATING CURRENT POWER SOURCE

(71) Applicant: Dell Products L.P., Round Rock, TX (US)

(72) Inventors: Timothy M. Lambert, Austin, TX (US); Dinesh Kunnathur Ragupathi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 15/366,784

(22) Filed: Dec. 1, 2016

(65) Prior Publication Data

US 2017/0102753 A1 Apr. 13, 2017

Related U.S. Application Data

(62) Division of application No. 14/832,653, filed on Aug. 21, 2015, now Pat. No. 9,541,976.

(51) Int. Cl.
*G06F 1/26* (2006.01)
*G06F 1/28* (2006.01)
*G06F 13/38* (2006.01)
*G06F 13/42* (2006.01)

(52) U.S. Cl.
CPC ............... *G06F 1/266* (2013.01); *G06F 1/28* (2013.01); *G06F 13/385* (2013.01); *G06F 13/4282* (2013.01)

(58) Field of Classification Search
CPC .......... G06F 1/266; G06F 1/28; G06F 13/385; G06F 13/4282
See application file for complete search history.

(56) References Cited

U.S. PATENT DOCUMENTS

| 7,159,132 B2 | 1/2007 | Takahashi |
| 7,162,651 B2 | 1/2007 | Brockhaus |
| 7,761,622 B2 | 7/2010 | Nguyen |
| 2016/0098222 A1 | 4/2016 | Tsai |

*Primary Examiner* — Stefan Stoynov
(74) *Attorney, Agent, or Firm* — Jackson Walker L.L.P.

(57) ABSTRACT

In accordance with embodiments of the present disclosure, a method may include powering on a management controller for providing out-of-band management to an information handling system using electrical energy provided by an external device via an external port, receiving a management task from the external device via the external port for coupling an external device to the management controller for communication of data between the external device and the management controller, calculating an additional amount of power required to perform the management task, instructing a controller coupled between the management controller and the external port to negotiate for the additional amount of power from the external device, and responsive to the controller successfully negotiating for the additional amount of power, performing the management task.

15 Claims, 6 Drawing Sheets

SYSTEMS AND METHODS FOR MANAGEMENT OF AN INFORMATION HANDLING SYSTEM HAVING NO ALTERNATING CURRENT POWER SOURCE

The present patent application is a divisional of a previously filed patent application, U.S. patent application Ser. No. 14/832,653, filed Aug. 21, 2015, the entirety of which is hereby incorporated by reference.

TECHNICAL FIELD

The present disclosure relates in general to information handling systems, and more particularly to systems and methods for managing an information handling system when the information handling system is not powered with electrical energy from an alternating current power source.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a management controller to provide for management of such information handling systems by another information handling system coupled to the management controller either by a network connection or via direct coupling between the other information handling system and the management controller. Examples of a management controller may include a baseboard management controller (BMC), a remote access controller (e.g., a Dell Remote Access Controller or Integrated Dell Remote Access Controller), or a chassis management controller (CMC).

Such a management controller may provide out-of-band management facilities for management of an information handling system. For example, such management may be made by a management controller even if an information handling system is powered off or powered to a standby state. However, when providing management capabilities during a powered off or standby state of the information handling system, the management controller and other components of the information handling system managed by the management controller are powered from an auxiliary power rail which is provided electrical energy from a power supply unit of the information handling system which converts an alternating current input source waveform into a direct current voltage delivered to the auxiliary power rail. However, in traditional approaches, in the event that an information handling system is not plugged into an alternating current power source or in the event of loss of an alternating current input when plugged in, the management controller is not powered and thus cannot be used for its management facilities.

SUMMARY

In accordance with the teachings of the present disclosure, the disadvantages and problems associated with existing approaches to managing an information handling system via a management controller thereof may be reduced or eliminated.

In accordance with embodiments of the present disclosure, an information handling system may include a processor, a management controller communicatively coupled to the processor for providing out-of-band management to the information handling system, an external port for coupling an external device to the management controller for communication of data between the external device and the management controller, and a controller coupled between the management controller and the external port, the controller configured to manage delivery of data between the external device and the management controller and to control power delivery from the external device to the management controller via the external port. The management controller may be further configured to, responsive to the external device being coupled to the external port, power on using electrical energy provided by the external device via the external port, receive a management task from the external device via the external port, calculate an additional amount of power required to perform the management task, instruct the controller to negotiate for the additional amount of power from the external device, and responsive to the controller successfully negotiating for the additional amount of power, perform the management task.

In accordance with these and other embodiments of the present disclosure, a method may include powering on a management controller for providing out-of-band management to an information handling system using electrical energy provided by an external device via an external port, receiving a management task from the external device via the external port for coupling an external device to the management controller for communication of data between the external device and the management controller, calculating an additional amount of power required to perform the management task, instructing a controller coupled between the management controller and the external port to negotiate for the additional amount of power from the external device, and responsive to the controller successfully negotiating for the additional amount of power, performing the management task.

In accordance with these and other embodiments of the present disclosure, an information handling system may include a processor, a management controller communicatively coupled to the processor for providing out-of-band management to the information handling system, an external port for coupling an external device to the management controller for communication of data between the external device and the management controller, and a controller coupled between the management controller and the external port, the controller configured to manage delivery of data between the external device and the management controller and to control power delivery from the external device to the management controller via the external port. The management controller may further be configured to, responsive to the external device being coupled to the external port, power on using electrical energy provided by the external device via the external port, instruct the controller to negotiate for a maximum amount of power deliverable from the external device, and responsive to a power fault of a power supply unit of the information handling system, continue operation of the management controller using electrical energy provided by the external device via the external port.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
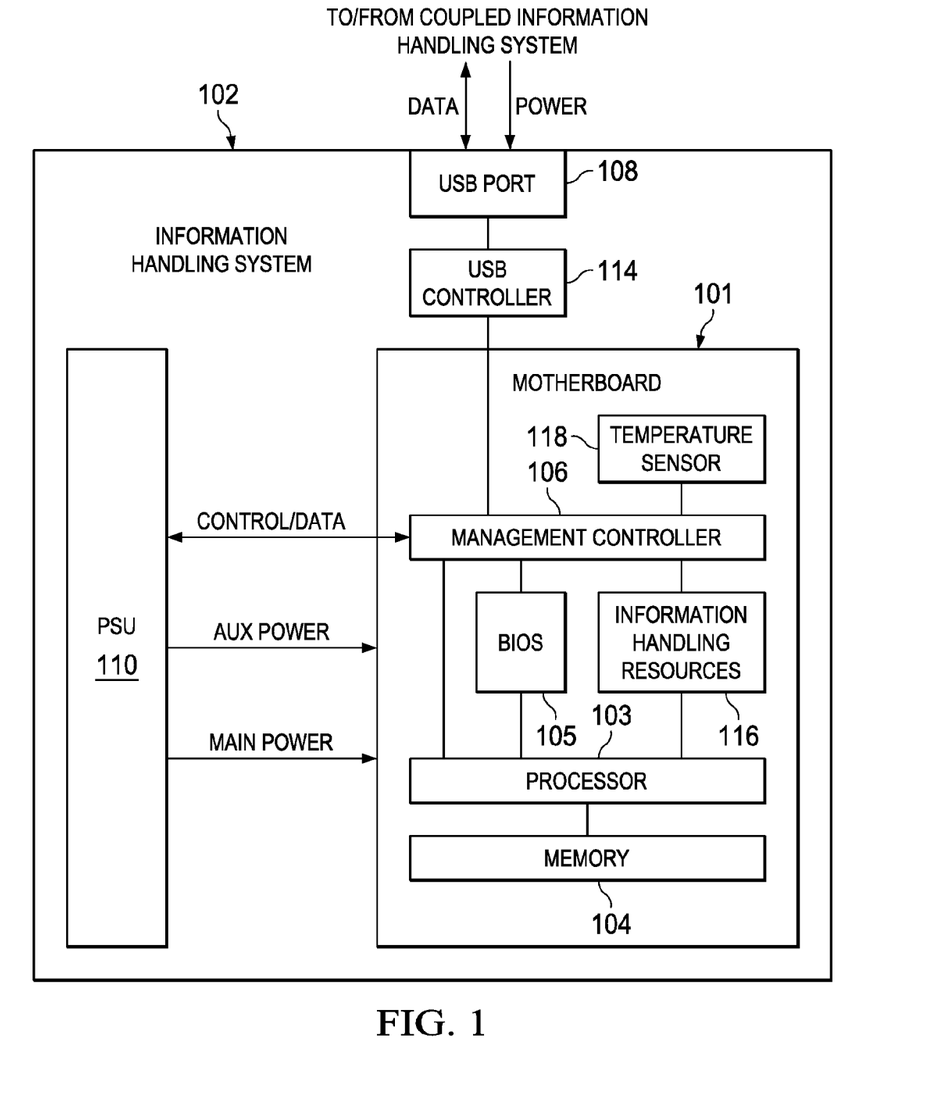
FIG. 1 illustrates a block diagram of an example information handling system, in accordance with embodiments of the present disclosure.

FIG. 1 illustrates a block diagram of an example of an information handling system 102. As depicted, information handling system 102 may include a power supply unit (PSU) 110, a motherboard 101, a Universal Serial Bus (USB) port 108, and a USB controller 114.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, a temperature sensor 118, and one or more other information handling resources 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. As shown in FIG. 1, PSU 110 may provide (a) a main power rail, indicated in FIG. 1 as "MAIN POWER," and (b) an auxiliary power rail, indicated in FIG. 1 as "AUX POWER." The main power rail may generally be used to provide power to information handling resources of information handling system 102 when operating at full power. On the other hand, the auxiliary power rail may generally be used to provide power to certain auxiliary information handling resources when energy is not supplied via the main power rail. For example, the auxiliary power rail may be used to provide power to management controller 106 when electrical energy is not provided to processor 103, memory 104, and/or other information handling resources via the main power rail.

USB port 108 may be communicatively coupled to management controller 106 via USB controller 114 and may comprise any system, device, or apparatus configured to provide an interface to couple an external device (e.g., another information handling system) to management controller 106. For example, in some embodiments, USB port 108 may comprise a USB Type C female port configured to receive a USB Type C male connector of a USB cable or USB-capable device.

USB controller 114 may be communicatively coupled to management controller 106 and may comprise any system, device, or apparatus configured to manage and/or control data communications between management controller 106 and a USB-enabled device (e.g., another information handling system) communicatively coupled to USB port 108. Although USB controller 114 is depicted external to motherboard 101, in some embodiments, USB controller 114 may be integral to motherboard 101. In some embodiments, USB controller 114 may be configured to negotiate for and draw power from a device communicatively coupled to it via USB port 108 (e.g., in accordance with USB Power Delivery (USB-PD) specification), and accordingly may include a switch for routing power among various components coupled to USB controller 114.

Temperature sensor 118 may be communicatively coupled to management controller 106 and may comprise any system, device, or apparatus (e.g., a thermometer, thermistor, etc.) configured to communicate a signal to management controller 106 indicative of a temperature within information handling system 102. Although temperature sensor 118 is depicted integral to motherboard 101, in some embodiments temperature sensor 118 may be located external to motherboard 101.

In addition to motherboard 101, processor 103, memory 104, BIOS 105, management controller 106, USB port 108, PSU 110, USB controller 114, information handling resources 116, and temperature sensor 118, information handling system 102 may include one or more other information handling resources.

In operation, in the absence of electrical energy via the main power rail and the auxiliary power rail (e.g., due to PSU 110 not being plugged into a power outlet, a loss of alternating current input source to PSU 110, a failure of PSU 110, etc.), management controller 106 may be configured to negotiate with a USB-enabled device (e.g., another information handling system, a power strip) coupled to USB port 108 to draw electrical energy from such coupled device in order to power management controller 106 and/or other components of information handling system 102. For example, management controller 106 may be configured to negotiate a variable wattage of requested power from the coupled device based on dynamic needs of information handling system 102, as determined by management controller 106. Accordingly, management controller 106 may be able to manage a dynamic power budget supplied by the coupled device in order to allocate the power budget among components of information handling system 102 in order to perform management operations on such components.

In these and other embodiments, management controller 106 may be configured to, based on thermal data (e.g., temperatures sensed by one or more temperature sensors 118) and the power budget supplied from the device coupled to USB port 108, determine which management operations may be performed in order to maintain thermal parameters of components within safe operating limits. Such functionality may be critical, as the power received from the coupled device may not be sufficient to both power thermal control components (e.g., air movers such as fans or blowers) and perform desired management operations. In addition, as described below, the coupled device may be configured to manage information handling system 102 while information handling system 102 is enclosed in a box for transit, meaning a thermal control system may not have the ability to effectively cool components of information handling system 102 as intake or exhaust vents may be covered up by portions of the box.

Figure 2:
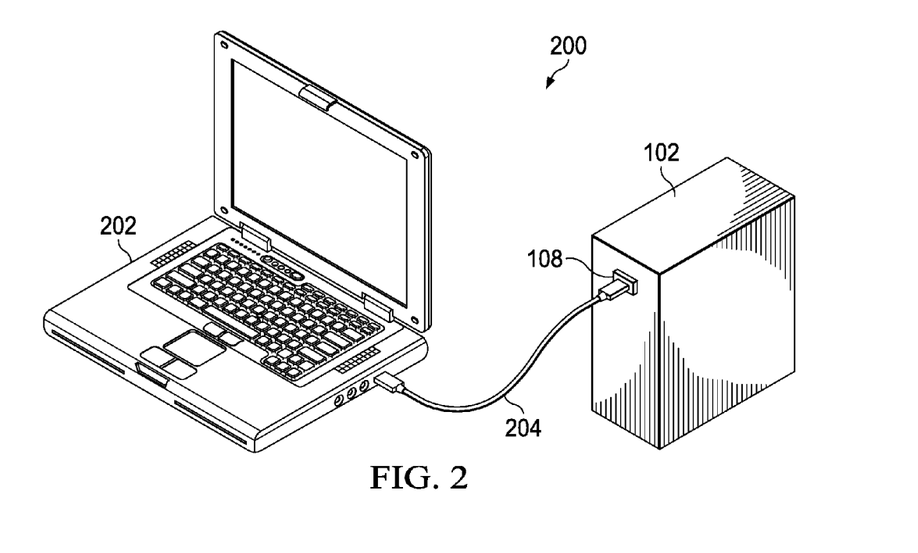
FIG. 2 illustrates an example system comprising an information handling system and a client information handling system communicatively coupled to a USB port of the information handling system via a USB cable, in accordance with embodiments of the present disclosure.

FIG. 2 illustrates an example system 200 comprising information handling system 102 and a client information handling system 202 communicatively coupled to USB port 108 via a USB cable 204, in accordance with embodiments of the present disclosure, which demonstrates one of a plurality of use cases that may be enabled by the methods and systems disclosed herein. In system 200, client information handling system 202 may comprise a laptop, notebook, tablet, handheld computer, or other information handling system that includes a management application or other application that may be used to manage another information handling system communicatively coupled to it. Accordingly, by coupling information handling system 102 to client information handling system 202 via USB port 108, client information handling system 202 may issue management instructions to management controller 106, and management controller 106 may negotiate with client information handling system 202 (e.g., negotiate with USB-PD capable components of information handling system 202 coupled to management controller 106) in order to provide power to management controller 106 and other components of information handling system 102 in order to complete such management instructions. In addition, although not shown in FIG. 2, in some embodiments, information handling system 102 may be enclosed in a box (e.g., cardboard box) for transit that may have an opening sufficient for an individual to plug USB cable 204 into USB port 108 to enable "in-the-box" management of information handling system 102. In these and other embodiments, although not shown in FIG. 2, a USB hub may be interfaced between client information handling system 202 and a plurality of information handling systems 102 (either "in-the-box" or removed from a box for transit) to facilitate management of multiple information handling systems 102 by client information handling system 202 and negotiation for power from client information handling system 202 by the multiple information handling systems 102.

Figure 3:
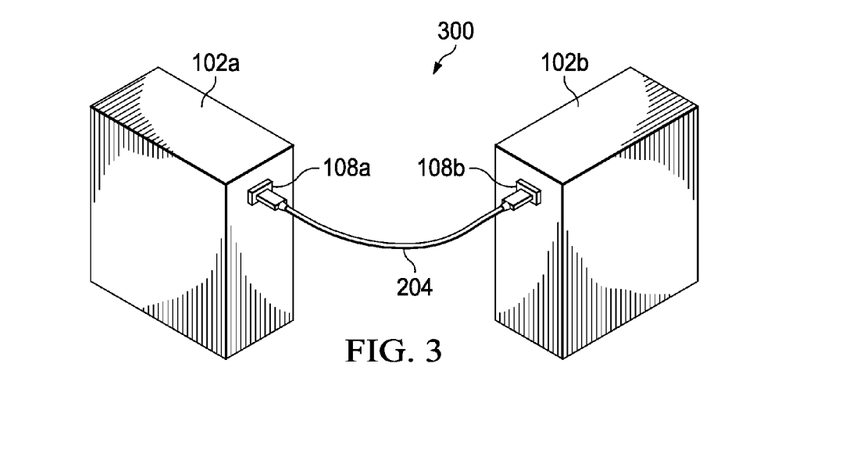
FIG. 3 illustrates an example system comprising information handling systems communicatively coupled to each other via a USB cable coupled between respective USB ports of the information handling systems, in accordance with embodiments of the present disclosure.

FIG. 3 illustrates an example system 300 comprising information handling system 102a and information handling system 102b communicatively coupled to information handling system 102a via a USB cable 204 coupled between USB port 108a of information handling system 102a and USB port 108b of information handling system 102b, in accordance with embodiments of the present disclosure, which demonstrates another one of a plurality of use cases that may be enabled by the methods and systems disclosed herein. In system 300, information handling system 102a may comprise a source information handling system which may already be provisioned (e.g., configured to function within an enterprise) while information handling system 102b may comprise an unprovisioned or "bare metal" to which configuration parameters of source information handling system 102a are to be cloned or migrated. Thus, the management controller 106 may be able to negotiate with source information handling system 102a (which may be powered from an alternating current input source) for power to undertake such cloning, migration or other configuration, as well as receive data and instructions from source information handling system 102a to perform such cloning, migration or other configuration. In some embodiments, when such cloning, migration or other configuration is complete, source information handling system 102a may be removed from an enterprise and replaced with target information handling system 102b. Such use case may be particularly useful when target information handling system 102b receives certain unique parameters from source information handling system 102a such as network addresses, as both information handling systems 102 may not need to be present on an enterprise network simultaneously which might lead to an address conflict.

Figure 4A:
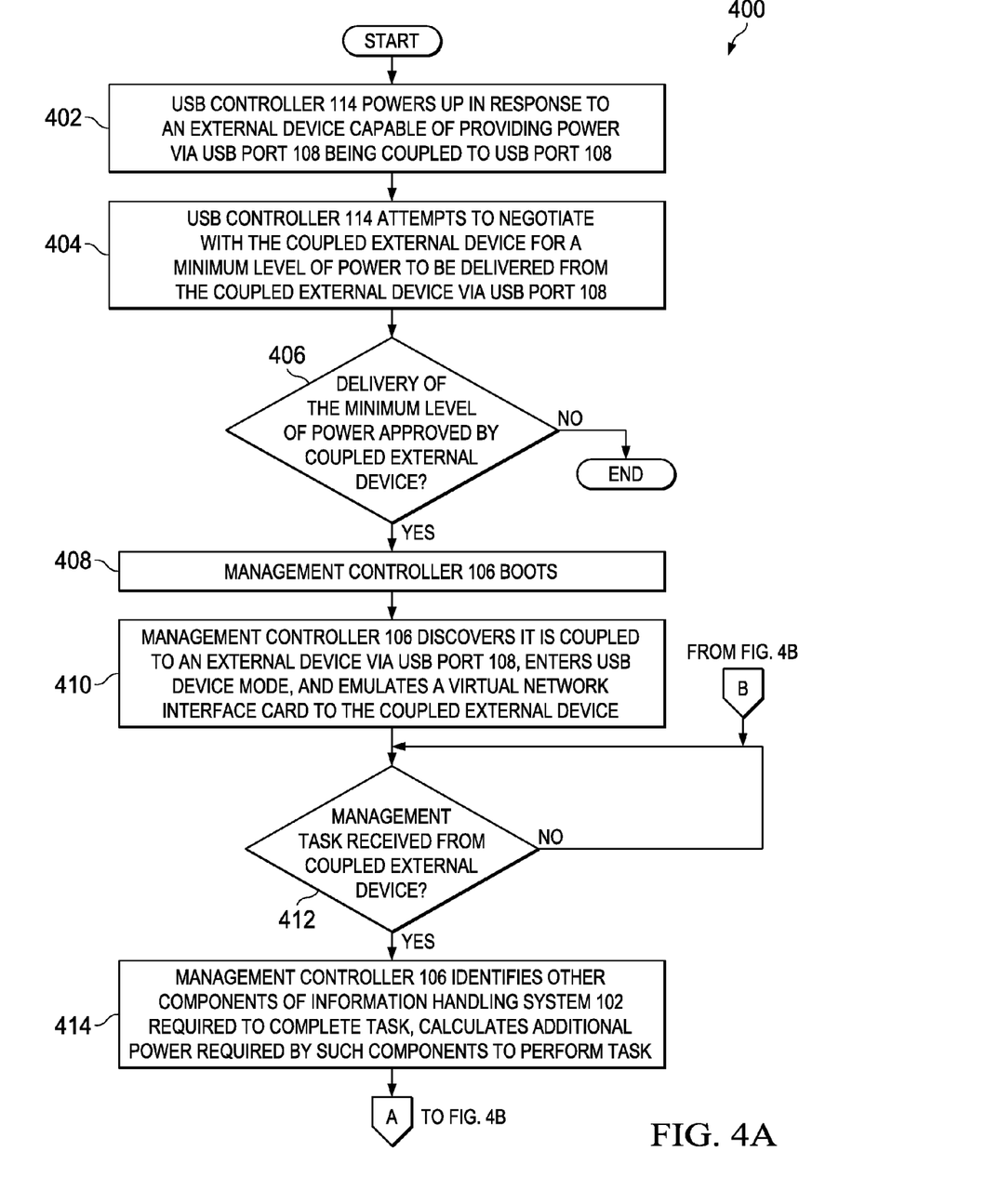
FIGS. 4A and 4B illustrate a flow chart of an example method for power negotiation by a management controller for power from a device coupled to a USB port communicatively coupled to the management controller, in accordance with embodiments of the present disclosure.
Figure 4B:
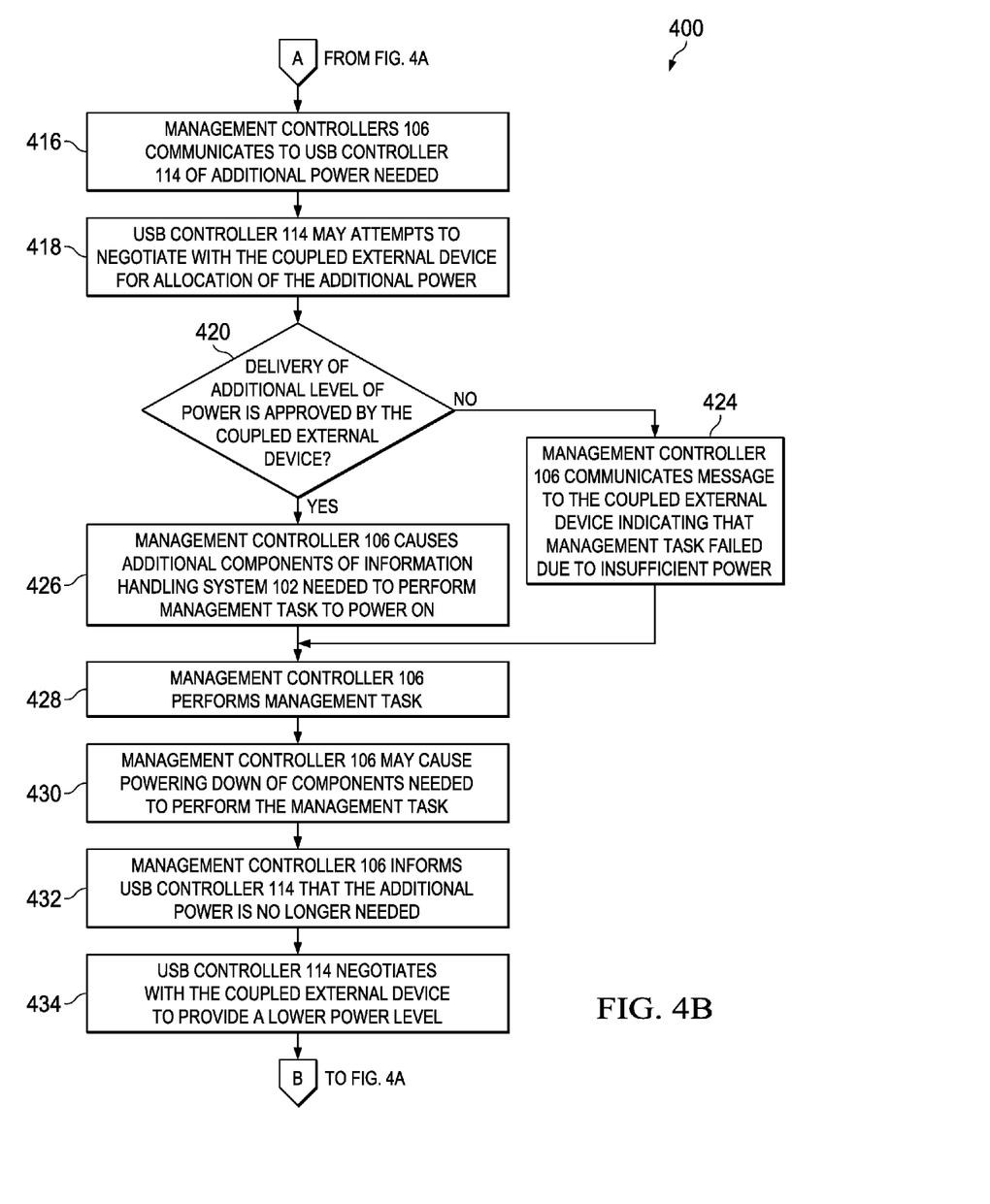

FIGS. 4A and 4B illustrate a flow chart of an example method 400 for power negotiation of management controller 106 for power from a device coupled to USB port 108, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen. In some embodiments, method 400 as shown in FIG. 4 may be used to implement the use cases described above with respect to FIGS. 2 and 3, as well as any other suitable use cases.

At step 402, USB controller 114 may power up in response to an external device (e.g., client information handling system 202, source information handling system 102a) capable of providing power via USB port 108 being coupled to USB port 108. At step 404, USB controller 114 may attempt to negotiate with the coupled external device for a minimum level of power (e.g., 15 watts) to be delivered from the coupled external device via USB port 108. At step 406, USB controller 114 may determine whether or not delivery of the minimum level of power is approved by the coupled external device. If the minimum level of power is approved, method 400 may proceed to step 408. If the minimum level of power is not approved, method 400 may end.

At step 408, responsive to the minimum level of power being approved by the coupled external device, management controller 106 may have sufficient power to boot and thus may boot. At step 410, management controller 106 may discover it is coupled to an external device via USB port 108 and may then enter USB device mode and emulate a virtual network interface card to the coupled external device.

At step 412, management controller 106 may wait for a management task from the coupled external device via USB port 108. If a management task is received, method 400 may proceed to step 414. Otherwise, method 400 may remain at step 412 until a management task is received.

At step 414, in response to receiving the management task, management controller 106 may identify other components of information handling system 102 required to complete the task and calculate additional power required by such components to perform the task. At step 416, management controller 106 may communicate to USB controller 114 the additional power needed. At step 418, USB controller 114 may attempt to negotiate with the coupled external device for allocation of the additional power.

At step 420, USB controller 114 may determine whether or not delivery of the additional level of power is approved by the coupled external device. If the additional level of power is approved, method 400 may proceed to step 426. If the additional level of power is not approved, method 400 may proceed to step 424.

At step 424, in response to the additional level of power not being approved by the coupled external device, management controller 106 may communicate a message to the coupled external device indicating that the management task failed due to insufficient power. After completion of step 424, method 400 may proceed again to step 412.

At step 426, in response to the additional level of power being approved by the coupled external device, management controller 106 may cause the additional components of information handling system 102 needed to perform the management task to power on. In some embodiments, management controller 106 may sequence powering on and powering off of such additional components if the management task can be performed with such sequencing, in order to reduce the power needed at a given time.

At step 428, management controller 106 may perform the management task. At step 430, in response to completion of the management task, management controller 106 may cause powering down of components needed to perform the management task. At step 432, management controller 106 may inform USB controller 114 that the additional power is no longer needed. At step 434, in response, USB controller 114 may negotiate with the coupled external device to provide a lower power level, as the additional power is no longer needed after completion of the management task. After completion of step 434, method 400 may proceed again to step 412.

Although FIGS. 4A and 4B disclose a particular number of steps to be taken with respect to method 400, method 400 may be executed with greater or fewer steps than those depicted in FIGS. 4A and 4B. In addition, although FIGS. 4A and 4B disclose a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Figure 5:
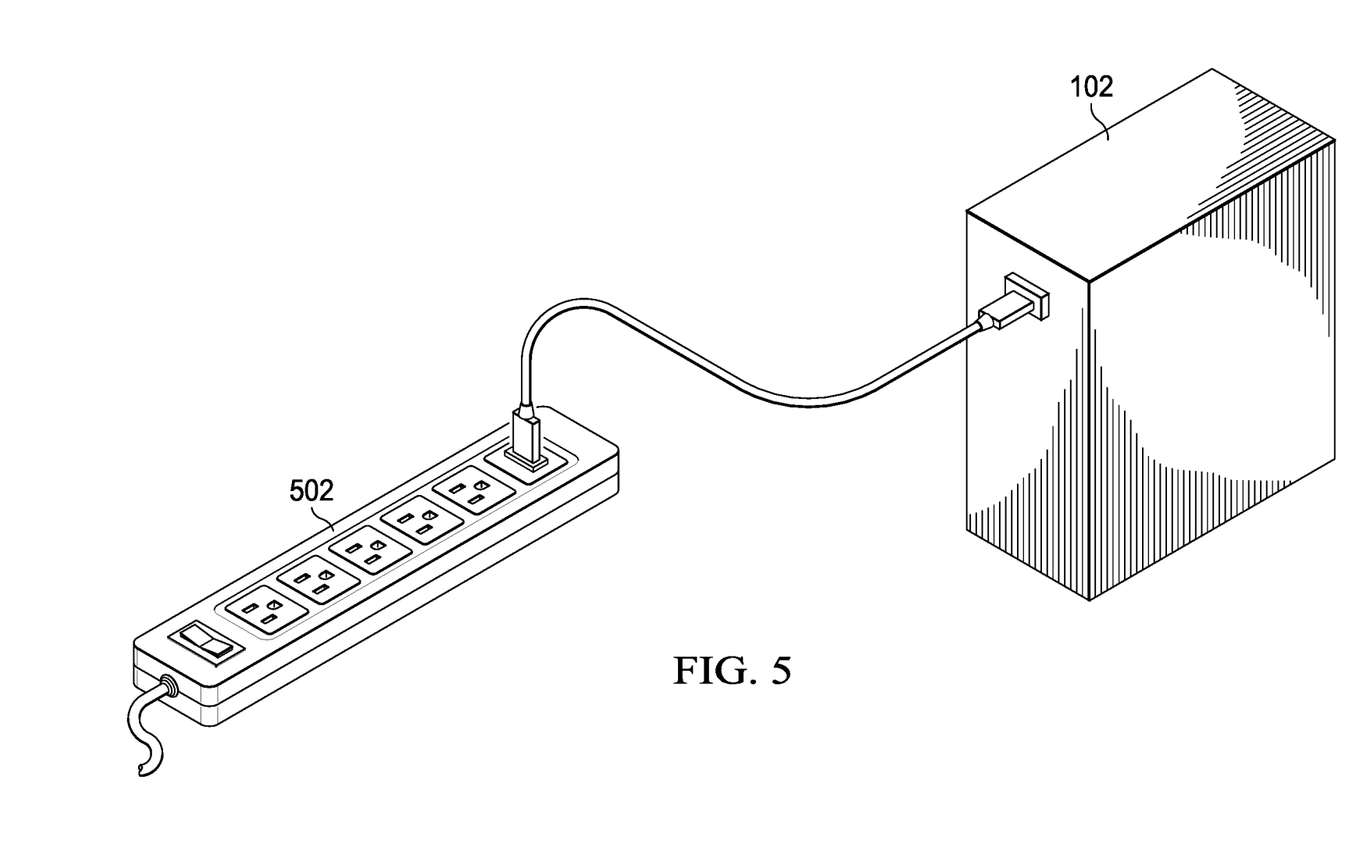
FIG. 5 illustrates an example system comprising an information handling system and an intelligent power strip communicatively coupled to a USB port of the information handling system via a USB cable, in accordance with embodiments of the present disclosure.

FIG. 5 illustrates an example system 500 comprising information handling system 102 and an intelligent power strip 502 communicatively coupled to USB port 108 via a USB cable 204, in accordance with embodiments of the present disclosure, which demonstrates one of a plurality of use cases that may be enabled by the methods and systems disclosed herein. In embodiments represented by FIG. 5, management controller 106 may be configured to negotiate for power from intelligent power strip 502 in order to serve as a supplemental power source to the main power rail and auxiliary power rail in the event of a loss of alternating current input source to PSU 110. With such negotiated supplemental power, management controller 106 may be able to remain operational after a loss of alternating current input source to PSU 110 to stay available for management operations (e.g., logging, altering, remote access) and/or for graceful shutdown of information handling system 102 in response to the loss of alternating current input source. In addition, management controller 106 may also be able to exchange data with intelligent power strip 502 (e.g., humidity information, network address of management controller 106, etc.) and/or control functionality of intelligent power strip 502 (e.g., power cycle the power strip in response to a command received by management controller 106 from a remotely-coupled management console).

Figure 6:
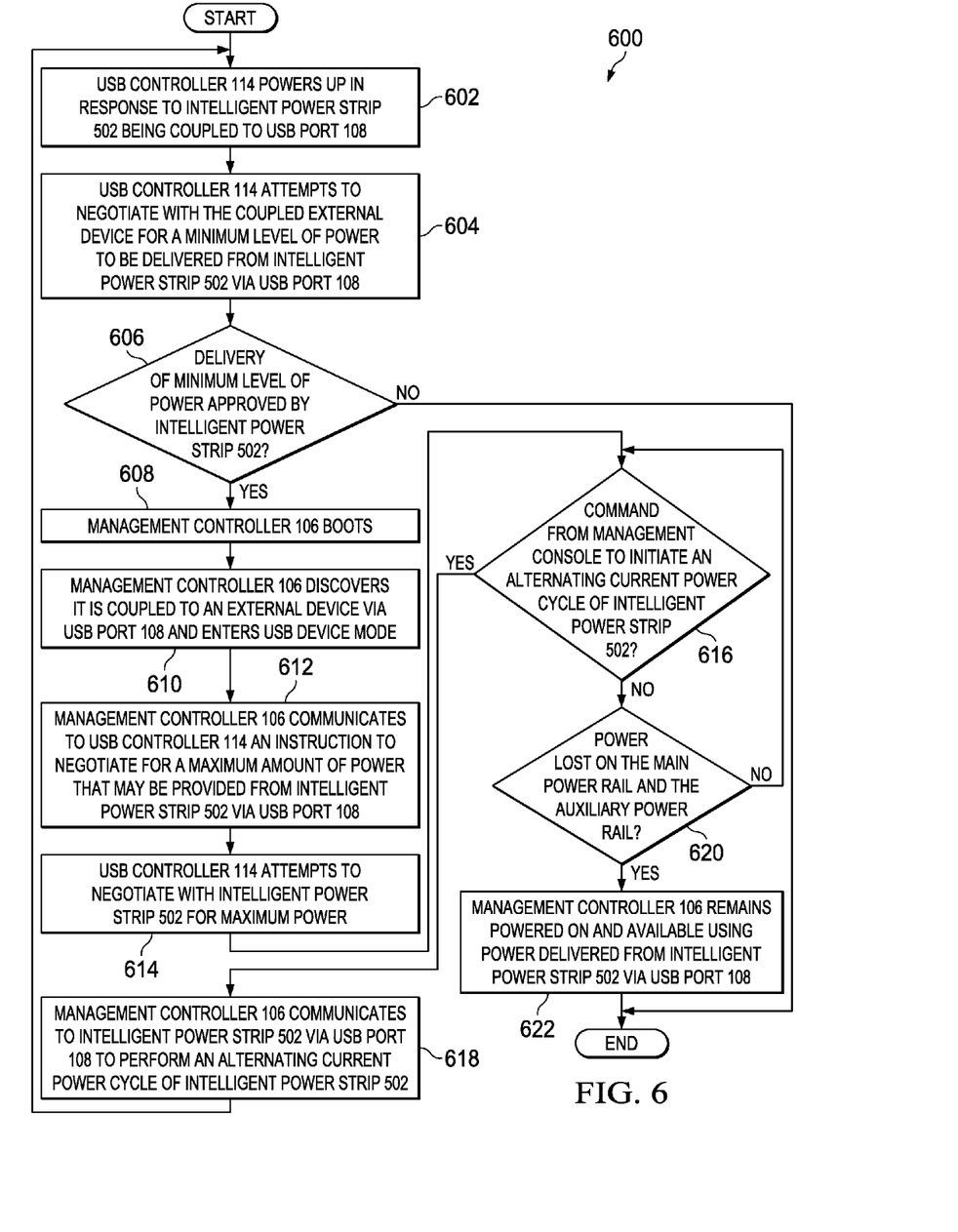
FIG. 6 illustrates a flow chart of an example method for power negotiation by a management controller for power from a power strip coupled to a USB port communicatively coupled to the management controller, in accordance with embodiments of the present disclosure.

FIG. 6 illustrates a flow chart of an example method 600 for power negotiation of management controller 106 for power from a power strip coupled to USB port 108, in accordance with embodiments of the present disclosure. According to some embodiments, method 600 may begin at step 602. As noted above, teachings of the present disclosure may be implemented in a variety of configurations of information handling system 102. As such, the preferred initialization point for method 600 and the order of the steps comprising method 600 may depend on the implementation chosen. In some embodiments, method 600 as shown in FIG. 6 may be used to implement the use cases described above with respect to FIG. 5, as well as any other suitable use cases.

At step 602, USB controller 114 may power up in response to intelligent power strip 502 being coupled to USB port 108. At step 604, USB controller 114 may attempt to negotiate with the coupled external device for a minimum level of power (e.g., 15 watts) to be delivered from intelligent power strip 502 via USB port 108. At step 606, USB controller 114 may determine whether or not delivery of the minimum level of power is approved by intelligent power strip 502. If the minimum level of power is approved, method 600 may proceed to step 608. If the minimum level of power is not approved, method 600 may end.

At step 608, responsive to the minimum level of power being approved by intelligent power strip 502, management controller 106 may have sufficient power to boot and thus may boot. At step 610, management controller 106 may discover it is coupled to an external device (e.g., intelligent power strip 502) via USB port 108 and may then enter USB device mode.

At step 612, management controller 106 may communicate to USB controller 114 an instruction to negotiate for a maximum amount of power that may be provided from intelligent power strip 502 via USB port 108. At step 614, USB controller 114 may attempt to negotiate with intelligent power strip 502 for the maximum power.

At step 616, management controller 106 may wait for a command from a management console communicatively coupled to management controller 106 to initiate an alternating current power cycle of intelligent power strip 502. If such a command is received, method 600 may proceed to step 618. Otherwise, method 600 may proceed to step 620.

At step 618, in response to a command from a management console communicatively coupled to management controller 106 to initiate a power cycle of intelligent power strip 502, management controller 106 may communicate to intelligent power strip 502 via USB port 108 to perform an alternating current power cycle of one or more ports/outlets of intelligent power strip 502. If PSU 110 is coupled to an alternating current outlet of intelligent power strip 502, method 600 may return again to step 602 after power is returned to PSU 110.

At step 620, management controller 106 may determine if power is lost on the main power rail and the auxiliary power rail, which may occur if PSU 110 loses its alternating current input source. If power is lost, method 600 may proceed to step 622. Otherwise, method 600 may return again to step 616.

At step 622, in response to power being lost on the main power rail and the auxiliary power rail, management controller 106 may remain powered on and available using power delivered from intelligent power strip 502 via USB port 108, in order to continue management operations (e.g., logging, alerting, remote management access, etc.) and/or facilitate a graceful shutdown of information handling system 102 in response to the loss of the alternating current input source. After completion of step 622, method 600 may end.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using information handling system 102 or any other system operable to implement method 600. In certain embodiments, method 600 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
  a processor;
  a management controller communicatively coupled to the processor for providing out-of-band management to the information handling system;
  an external port for coupling an external device to the management controller for communication of data between the external device and the management controller; and
  a controller coupled between the management controller and the external port, the controller configured to manage delivery of data between the external device and the management controller and to control power delivery from the external device to the management controller via the external port;
  wherein the management controller is further configured to, responsive to the external device being coupled to the external port:
    power on using electrical energy provided by the external device via the external port;
    instruct the controller to negotiate for a maximum amount of power deliverable from the external device; and
    responsive to a power fault of a power supply unit of the information handling system, continue operation of the management controller using electrical energy provided by the external device via the external port.

2. The information handling system of claim 1, wherein the external device comprises an intelligent power strip.

3. The information handling system of claim 2, wherein the power supply unit is coupled to the intelligent power strip for receiving an alternating current input source.

4. The information handling system of claim 3, wherein the management controller is further configured to, responsive to an instruction to power cycle the intelligent power strip, cause the intelligent power strip to power cycle one or more outlets of the power strip.

5. The information handling system of claim 1, wherein the external port is a Universal Serial Bus port and the controller is a Universal Serial Bus controller.

6. A method comprising:
  powering on a management controller for providing out-of-band management to an information handling system using electrical energy provided by an external device via an external port;
  instructing a controller coupled between the management controller and the external port to negotiate for an additional amount of power from the external device; and
  responsive to a power fault of a power supply unit of the information handling system, continuing operation of the management controller using electrical energy provided by the external device via the external port.

7. The method of claim 6, wherein the external device comprises an intelligent power strip.

8. The method of claim 7, wherein the power supply unit is coupled to the intelligent power strip for receiving an alternating current input source.

9. The method of claim 8, wherein the management controller is further configured to, responsive to an instruction to power cycle the intelligent power strip, cause the intelligent power strip to power cycle one or more outlets of the intelligent power strip.

10. The method of claim 7, wherein the external port is a Universal Serial Bus port and the controller is a Universal Serial Bus controller.

11. A management controller for providing out-of-band management to an information handling system, the management controller configured to:
  power on using electrical energy provided by an external device via an external port;
  instruct a controller coupled between the management controller and the external port to negotiate for an additional amount of power from the external device; and
  responsive to a power fault of a power supply unit of the information handling system, continue operation of the management controller using electrical energy provided by the external device via the external port.

12. The management controller of claim 11, wherein the external device comprises an intelligent power strip.

13. The management controller of claim 12, wherein the power supply unit is coupled to the intelligent power strip for receiving an alternating current input source.

14. The management controller of claim 13, wherein the management controller is further configured to, responsive to an instruction to power cycle the intelligent power strip, cause the intelligent power strip to power cycle one or more outlets of the intelligent power strip.

15. The management controller of claim 12, wherein the external port is a Universal Serial Bus port and the controller is a Universal Serial Bus controller.

\* \* \* \* \*